3,164,945
LAWN RAKES
Thomas A. Spencer, 337 Manhattan Ave.,
Daytona Beach, Fla.
Filed Jan. 14, 1963, Ser. No. 251,154
1 Claim. (Cl. 56—400.12)

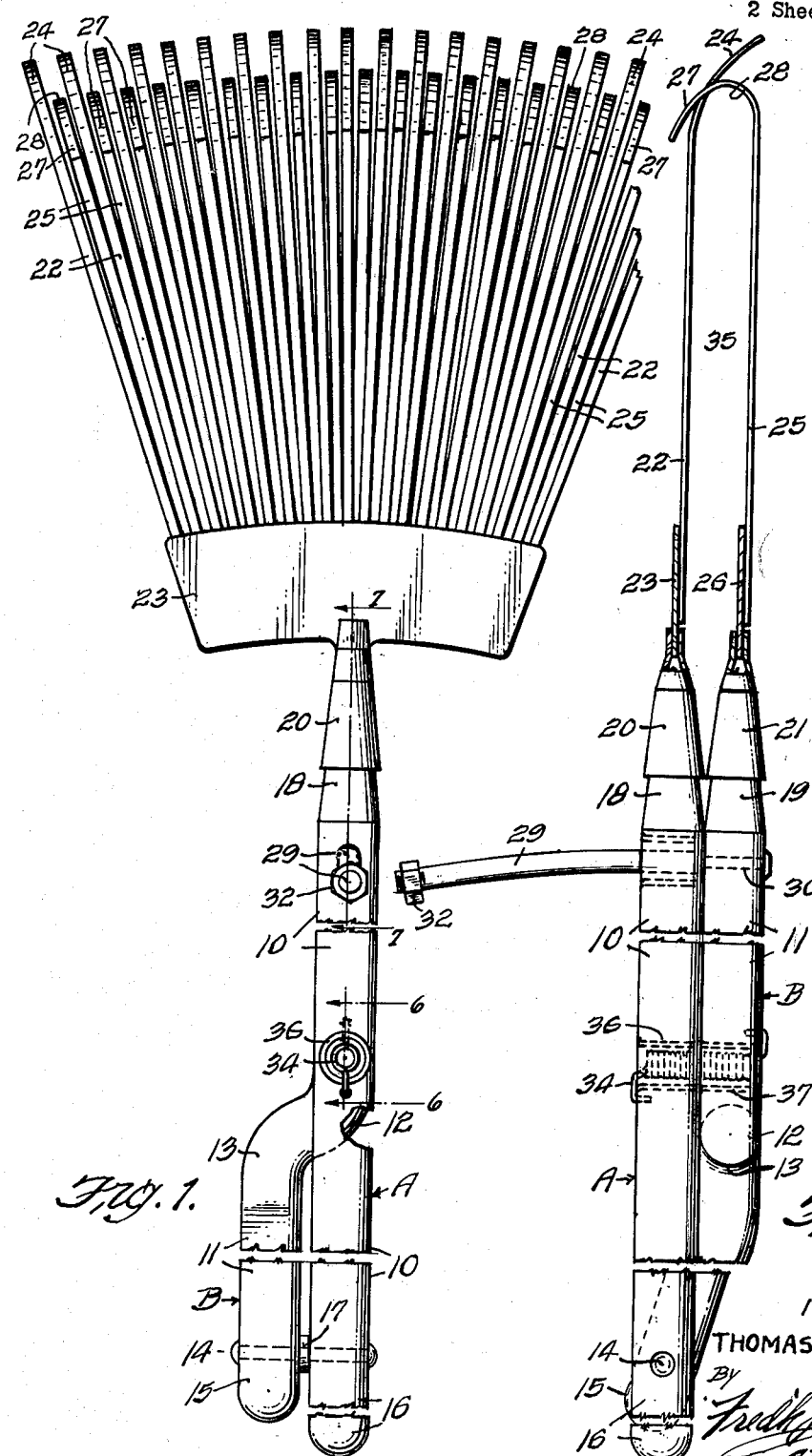

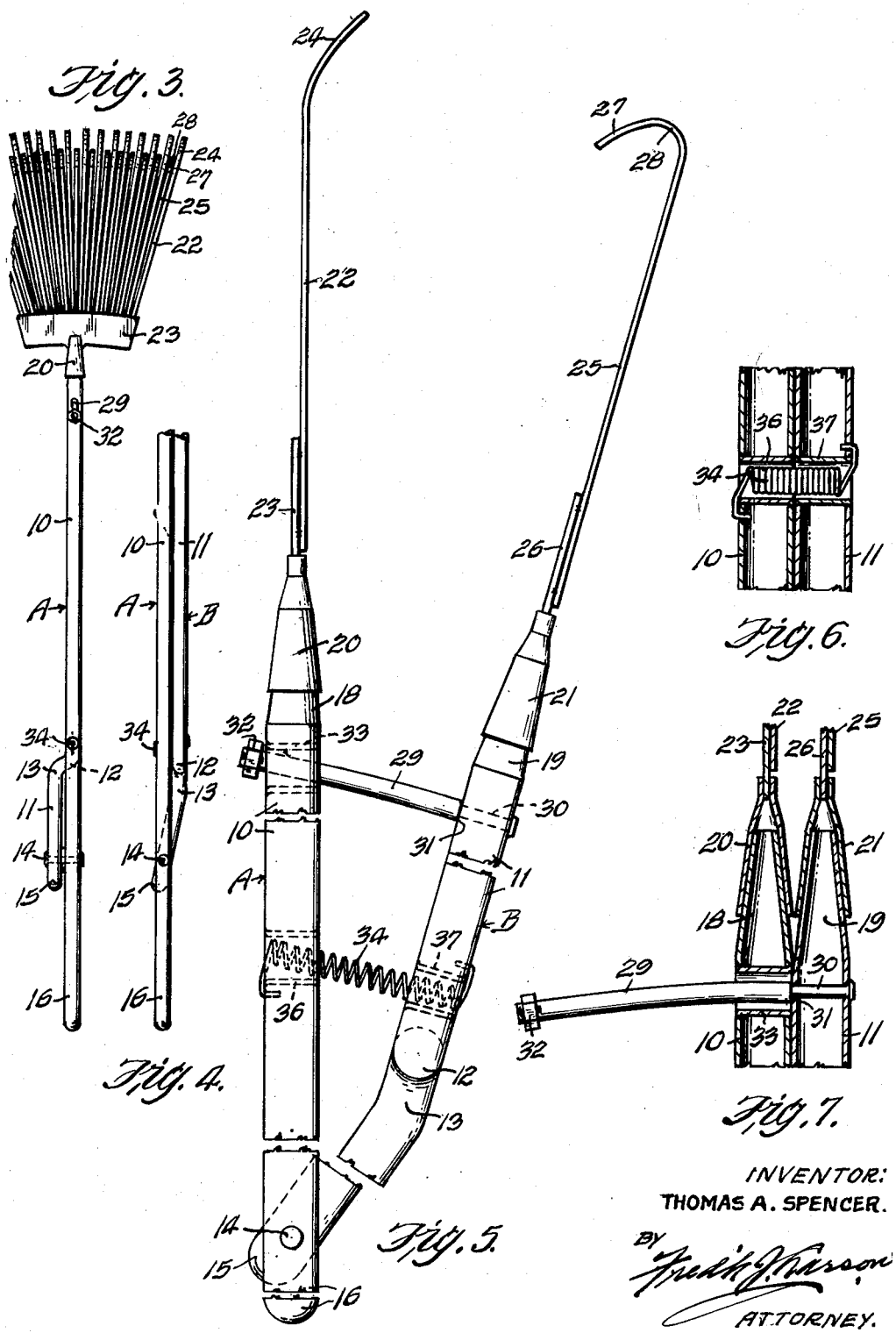

My present invention relates to improvements in lawn rakes, and is designed particularly for collecting and automatically trapping leaves, straw, husks, sticks, paper, and other debris merely by the normal raking motion thereof, and without raking into piles; its trapping action being dependent on the interaction of two opposing rake-heads between which the debris is trapped.

An object of the invention is to provide a composite lawn rake made essentially of one complete lawn rake and part of another; the constituent complete rake, referred to hereinafter as the raking element, being the usual type of lawn rake having a handle or normal length and diameter and having a relatively long-tined rake-head secured to one end thereof; the constituent partial rake referred to hereafter as, the trapping element, having a complete rake-head, except the quantity of tines may be one less than the other rake-head and with tines of greater curvature and accordingly effectively shorter than those of the constituent complete rake, and having only a short and preferably curved shaft, or handle, with its upper end pivoted to the handle of the raking element at a point below that portion thereof customarily gripped by the user, so that the bases of the two rake-heads are in alignment and the curvatures of the two sets of tines are arranged in opposing fashion with the tines intermeshed.

A further and important object of the invention is to provide a contrast in the curvature and effective length of the tines in the two opposing and aligned rake-heads, the tines of the raking element having the customary slight bend of many lawn rakes at their free ends, whereas the tines of the trapping element have relatively sharp ends resulting in a curvature somewhat similar to that of a partial circle and resulting in a shorter effective length, although both types of tines are made of material of the same length.

A further object of the invention is to provide a composite lawn rake which after automatically trapping leaves and/or other debris as a result of normal raking motions can be readily emptied by the weight thereof when the two associated and opposing rake-heads are slightly separated and turned edgewise to the ground, thus eliminating practically all of the stooping now involved in the removal of leaves and/or other debris.

A further object of the invention is to provide a spring which normally holds the two rake-heads in the parallel proximity which is desirable for storing and carrying the tool, and which provides the slight tension that seems to improve the automatic trapping of leaves and/or other debris as the tool is used to rake terrain like an ordinary rake.

Another object of the invention is to provide means to assure that the tines of the two rake-heads will remain in alignment in spite of wear, etc.

Another object of my invention is to provide a composite lawn rake which, in addition to its primary function as a trapping rake for leaves and/or other debris, can be used in a fashion similar to any other lawn rake for simple raking operations such as raking a driveway surfaced with fine stones.

Other objects and advantages of the invention will be apparent during the course of the following description.

In the accompanying drawings, forming a part of this application, like numerals of reference are employed to designate like parts throughout the several views of the drawings.

Referring to the drawings:
FIGURE 1 is a plan view of the rake embodying my invention with portions thereof broken away.
FIGURE 2 is a view partly in side elevation of the rake with portions of the rake handle and the rake shaft broken away, with the rake-heads and parts of the handle sockets in section, and showing the rake in its closed position.
FIGURE 3 is a plan view in small scale to give a comprehensive view of the rake.
FIGURE 4 is a side view of FIGURE 3 with portions broken away.
FIGURE 5 is a side elevation of the rake showing the trapping element shaft and its tined rake-head in its open angular position relative to the raking element handle and its tined rake-head.
FIGURE 6 is a detail in cross-section taken on line 6—6 of FIGURE 1.
FIGURE 7 is a detail in cross-section taken on line 7—7 of FIGURE 1.

In the accompanying drawings, for the purpose of illustration, there is shown a preferred embodiment of my invention, comprising a raking element designated, generally, as A, having a handle 10 of the usual length and diameter, and a trapping element designated, generally, as B, having a shaft 11 which, preferably, is bent at points along its length to provide an offset upper end portion for engaging a pivot.

In order to minimize the weight of the rake, the trapping element shaft 11 is preferably tubular in cross-section and may be of aluminum, magnesium or other tubular material. The raking element handle 10 could be made of wood, but to simplify construction and to minimize weight, it would probably be made of the same material as the shaft 11.

The diameter and length of the handle 10 of the raking element A will agree in size with the handles normally used for lawn rakes. The shaft 11 of the trapping element B could differ in diameter from that of the handle 10, but at this time there appears to be no advantage in such an arrangement. As shown on the drawings, the length of shaft 11 is less than that of handle 10 and it preferably has bends 12 and 13 along its length to align it with the handle 10 horizontally at the pivot 14 and vertically in the lower shaft section leading to the rake-head hereinafter described.

A functional working model of the tool has been made with a straight shaft. The length of the shaft is such that essential vertical alignment of the shaft and handle near the rake-heads is possible with normal play in the pivot, at which point the shaft and handle are horizontally aligned. This would be a cheaper method of construction.

Pivot pin 14 is used at the upper end 15 of shaft 11 to connect it to handle 10 below the upper end portion 16 of handle 10. For assembly, the ends of the pivot pin are shown as flattened and spread by impact, or flared, but other satisfactory ways could be used. The pivot pin may carry a spacer 17 to space handle 10 from shaft 11 so as to alleviate friction.

The lower end of handle 10 and the lower end of shaft 11 are tapered as at 18 and 19, and these tapered ends tightly fit into tapered sockets 20 and 21. This is common practice in rake structures.

A plurality of flat relatively long flexibly resilient tines 22 may be spot welded, or otherwise secured to, and extended from raking element A headplate 23, and each tine 22 has a relatively long shallow curve 24 at its free raking end.

A plurality of flat flexibly resilient tines 25 may be spot welded to rake-head 26 of the trapping element B. As shown in FIGURES 2 and 5 of the drawing each of the tines 25 has its free end 27 provided with a relatively sharp curve 28 having a contour of roughly one-third of a circle, and accordingly the tines 25 are effectively shorter than the tines 22 of the rake-head 23, although made from spring sheet metal of the same length. The tines 22 and 25 are arranged preferably, in a fan-shaped fashion, but could be arranged instead, in a rectangular formation.

Any of the usual ways manufacturers use in attaching tines to rake-heads may be employed in lieu of the way shown on the drawings. Preferably, the trapping tines 25 may be intermeshed or staggered with reference to the raking tines 22, as shown in FIGURES 1 and 2 of the drawings, or, the trapping tines may be directly aligned with the raking tines so that there is no intermeshing. If intermeshed as shown on the drawings, the quantity of tines 25 would be one less than that of tines 22. The leaves, straw, husks, paper, and/or other debris is trapped in the space between the two sets of tines. Normally, there is some space between the two set of tines, and this space will automatically increase somewhat if the amount of debris trapped requires additional space.

Alignment member 29 has its lower end reduced in diameter to provide a stud portion 30 with a shoulder 31 at the upper end of the stud portion. Also, the other end of the alignment member 29 is provided with a stop-nut 32, as shown on the drawings, to prevent over-swing as the trapping element B is separated from the raking element A when discharging debris from the tool. The shoulder 31 at the upper end of the stud portion 30 will tightly engage the outer wall of the trapping shaft 11 after the lower end of the stud portion 30 is flared and staked to the curved wall of shaft 11, thus holding alignment member 29 tightly in position to prevent displacement either longitudinal or rotary.

Alignment member 29 is sufficiently long to permit trapping element B to swing away from raking element A far enough to permit the ready emptying of debris from the trapping space located between the two sets of tines 22 and 25, and its main function is to guide the trapping tines 25 as they return to their normally closed position, as shown on FIGURE 2 of the drawings. As shown in FIGURE 7 of the drawings, the alignment member 29 passes through a sleeve 33 secured by flaring or otherwise in openings in the opposed walls of the tubular raking element handle 10. The gentle curve of alignment member 29 is provided to accommodate the radial swing of the trapping element B.

Tension spring 34, shown in FIGURE 6 of the drawings, restores the rake-head 26 of the trapping element B to a position adjacent to rake-head 23 of the raking element A, and this spring if made of moderate strength also increases the effectiveness of the tool in trapping leaves, and/or other debris collected in the trapping space 35 between the two sets of tines 22 and 25. The retention of trapping element rake-head 26 adjacent to the raking element rake-head 23 is also of value when storing and carrying the tool. To provide for smooth operation of the tension spring 34, associated holes in the handle 10 and shaft 11 may have sleeves 36 and 37 which are secured by flaring their ends. One end of spring 34 may be anchored in a hole in the outer wall of handle 10 and the other end in a hole in the outer wall of shaft 11. To minimize the length of spring 34, it is located relatively close to the pivot, and it would be possible in fact, instead of the arrangement shown, to associate a torsion spring with the pivot or to combine the pivot and torsion features in a torsion bar.

In use, this rake is grasped by the upper end portion 16 of the handle 10 of raking element A, and operated with tines 22 facing downward in a fashion similar to any other lawn rake. As the lawn is raked with this tool, leaves and/or other debris are collected and trapped in the debris trap 35 located between the two sets of rake-head tines 22 and 25.

The friction while raking between the lawn and the long flexibly resilient tines 22 causes these tines to separate momentarily and intermittently from the shorter curved tines 25. This brief separation is adequate for the trapping of debris which, due to the sharp curvature of tines 25, is retained within the trapping space 35 until the operator empties the tool. The tool will trap debris even when spring 34 is omitted, but a weak spring seems to improve the operation, and it is also desirable when storing and carrying the tool to have the trapping element B in a position adjacent to the raking element A.

The tool is emptied of leaves and/or other debris trapped between the two sets of tines 22 and 25 in the following manner: While retaining a grip on the upper end portion 16 of the raking element handle 10, the body of the rake is raised by the other hand placed under shaft 11 near tension spring 34. The rake is then turned so that the rake-heads 23 and 26 are edgewise to the ground, and trapping element B is separated from raking element A by gentle pressure of the fingers of the hand located near and working against spring 34. This permits the weight of the debris to cause the same to fall out of the debris trapping space 35. After the tool has been emptied, tension spring 34 restores the trapping element B to its normally closed position adjacent to the raking element A, as shown in FIGURE 2 of the drawings.

In addition to its function as a trapping device for leaves and/or other debris, this tool can be used as a regular lawn rake for jobs such as smoothing the fine stones of a driveway, etc.

The many advantages of the herein described invention will readily suggest themselves to those skilled in the art to which it belongs.

It is to be understood that the form of my invention herein described and shown, is to be taken as a preferred example of the same, and that various changes in the shape, size, strength, tensions, curvatures, quantity, positioning and arrangement of parts, may be made without departing from the spirit of my invention, or the scope of the appended claim.

Having thus described my invention, I claim:

A composite rake for lawns, meadows, and similar areas comprising a first rake-head provided with a socket at one end thereof, a first plurality of long, resilient metal tines extending from the other end of said first rake-head, said first plurality of tines having a slight curvature at their free ends, an elogated handle attached to the socket of said first rake-head; a second rake-head provided with a socket at one end thereof, a second plurality of long, resilient metal tines extending from the other end of said second rake-head, said second plurality of tines also having a curvature at their free ends, the curvature of said second plurality of tines being greater than the curvature of said first plurality of tines, an elongated shaft attached to the socket of said second rake-head; pivot means joining said handle and said elongated shaft, said pivot means being located whereby said first and second pluralities of tines normally intermesh and whereby the free ends of said first plurality of tines extend beyond the free ends of said second plurality of tines; an alignment means comprising a curved shaft, said curved shaft being rigidly connected to said elongated shaft and being slidably connected to said handle, and spring means interconnecting said elongated shaft and said handle.

References Cited by the Examiner

UNITED STATES PATENTS

| | | | |
|---|---|---|---|
| 2,136,849 | 11/38 | Hembree | 56—400.12 |
| 2,504,943 | 4/50 | Zifferer | 56—400.12 |
| 2,746,234 | 5/56 | Utley | 56—400.12 |
| 2,891,374 | 6/59 | Richmond | 56—400.12 |
| 2,908,131 | 10/59 | Ross | 56—400.04 |

T. GRAHAM CRAVER, *Primary Examiner.*

RUSSELL R. KINSEY, *Examiner.*